J. H. BERRY.
VEHICLE WIND SHIELD.
APPLICATION FILED SEPT. 10, 1914.
1,217,265.
Patented Feb. 27, 1917.
2 SHEETS—SHEET 1.
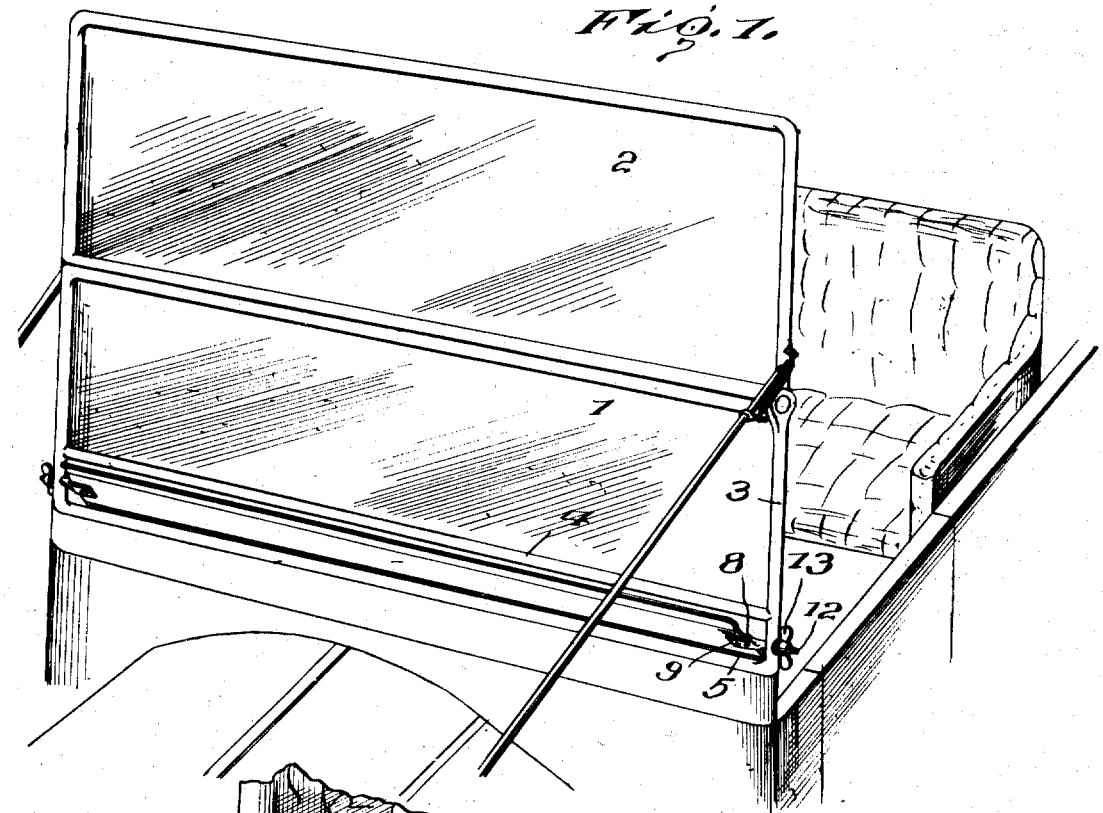
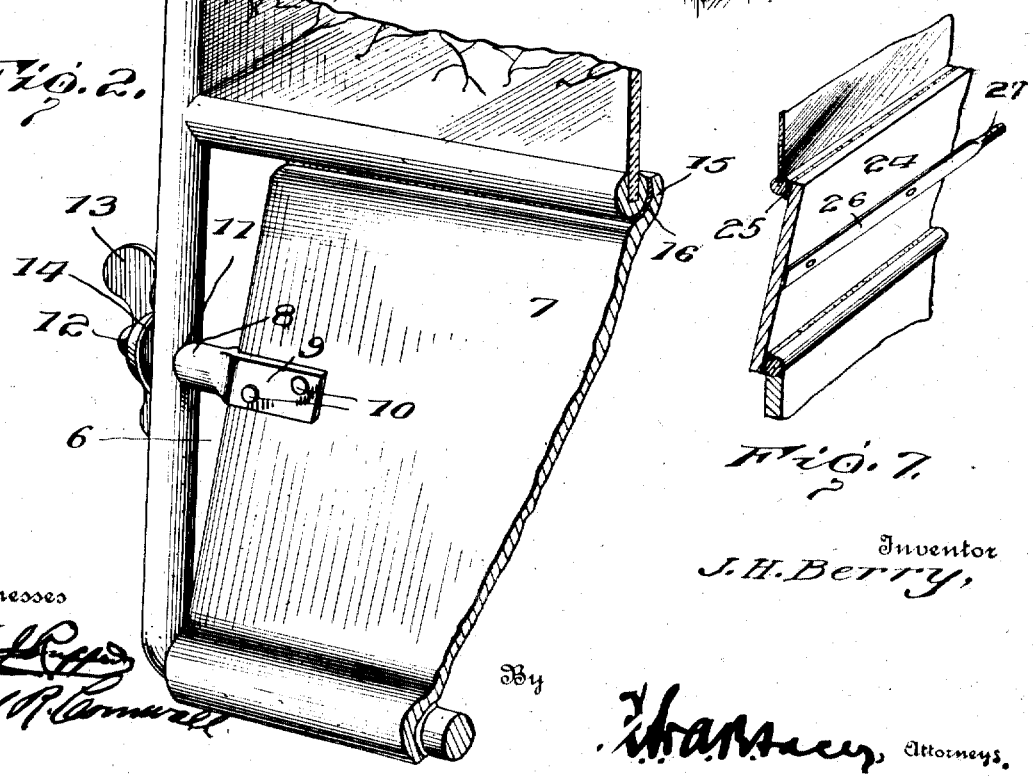
Inventor
J. H. Berry, J. H. BERRY.
VEHICLE WIND SHIELD.
APPLICATION FILED SEPT. 10, 1914.
1,217,265.
Patented Feb. 27, 1917.
2 SHEETS—SHEET 2.
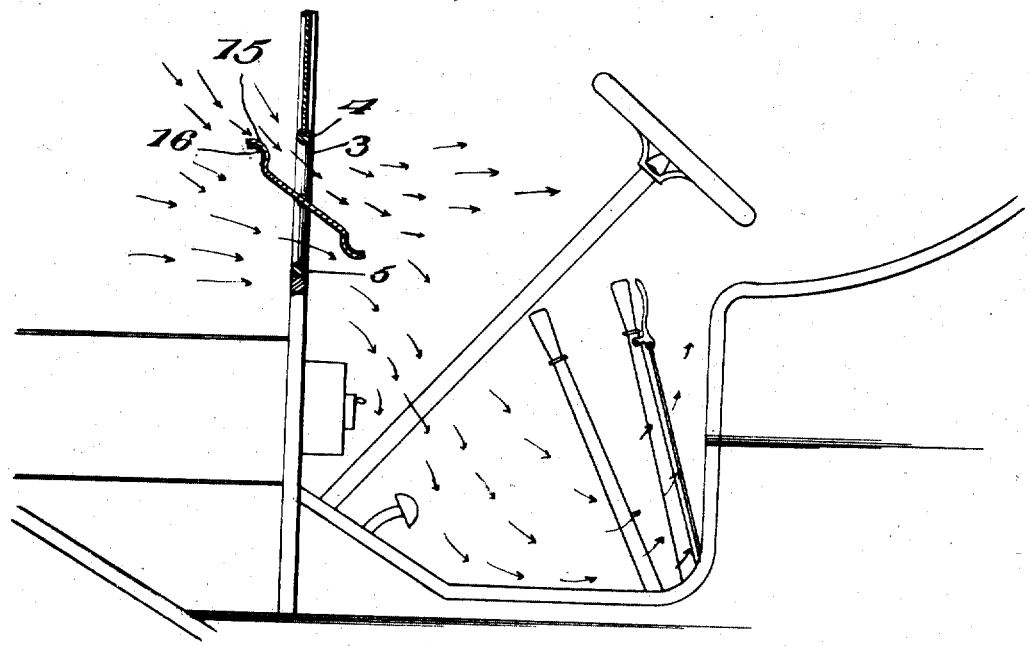
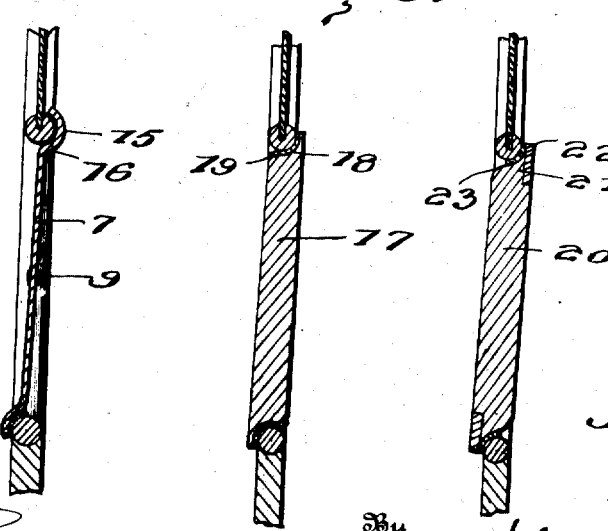
Witnesses
Inventor
J. H. Berry
By
Attorneys

UNITED STATES PATENT OFFICE.

JESSE H. BERRY, OF BOSTON, MASSACHUSETTS.

VEHICLE WIND-SHIELD.

1,217,265.

Specification of Letters Patent. Patented Feb. 27, 1917.

Application filed September 10, 1914. Serial No. 861,051.

*To all whom it may concern:*

Be it known that I, JESSE H. BERRY, citizen of the United States, residing at Winter Hill Station, Boston, in the county of Suffolk and State of Massachusetts, have invented certain new and useful Improvements in Vehicle Wind-Shields, of which the following is a specification.

This invention relates to improvements in vehicle windshields and has as its object to provide a ventilated windshield adapted to direct a current of air in a downward direction within the body of the vehicle rearwardly of the dash and along the floor therof in front of the vehicle seat.

It is one aim of the invention to so construct the ventilating device that it may be manufactured at a low cost and may, if desired, be embodied in the construction of any ordinary windshield already in use with but slight alteration of the shield. The invention also aims to so construct the ventilating device that it will not be liable to rattle or liable to be jarred out of its adjusted position.

Further, the invention aims to so arrange the ventilator plate comprising the device that when the same is in open position, it will project at opposite sides of the plane of the shield so as to act more effectually than it would if hinged or pivoted at one edge and adapted to lie wholly at one side of the plane of the shield when opened.

In the accompanying drawings:—

Figure 1 is a perspective view of a windshield embodying the present invention,

Fig. 2 is a detail perspective view of one end of the ventilating device,

Fig. 3 is a side elevation partly in section, the ventilator plate being shown in open position, Fig. 4 is a detail front to rear sectional view illustrating the ventilator plate closed, Fig. 5 is a view similar to Fig. 4 illustrating a slightly modified form of ventilator plate, Fig. 6 is a similar view illustrating a further modification, and Fig. 7 is a sectional perspective view illustrating a further modified form of plate.

Corresponding and like parts are referred to in the following description and indicated in all the views of the drawing by the same reference characters.

In the drawings, the windshield is, except for the structure embodying the present invention, of the ordinary type including a lower section 1 and an upper section 2 hingedly connected therewith in the usual manner. These sections comprise the usual frames in which the transparent panes are mounted and the frame of the lower section includes end bars 3 and spaced parallel bottom bars 4 and 5. The bars 3, 4, and 5, bound a space 6 through which a current of air is to pass while the vehicle is in motion and which is to be directed in a general downward direction as illustrated by the arrows in Fig. 3 of the drawings through the medium of the ventilator plate embodying the invention and mounted in this space.

The ventilator plate mentioned above may be made of any suitable material and in some instances it will be of sheet metal and in other instances, of wood, or built of both metal and wood, or if desired, may be wholly or partly made of glass or some other transparent material. In that form of the invention shown in Figs. 1 to 4 inclusive, the plate is indicated in general by the numeral 7 and is made from sheet metal, and it is of a length substantially equal to the distance between the end bars 3 of the frame of the lower section 1 and of a width to substantially completely close the space 6 when in one of its positions of adjustment. Where the lower corners of the frame of the lower section 1 are curved it is preferable that the end edges of the plate 7 be arcuate so that the plate will be adapted to more completely close the space 6 when the plate is so adjusted. It will be understood, however, that the ends of the plate may be made of any desired shape so as to accomplish this result. In this form of the invention, the ventilator plate 7 is provided at each end with a pivot stud 8 having a bifurcated attaching portion 9 which is fitted to the respective end of the plate 7 and secured in place by bolts or rivets 10. The studs 8 fit pivotally in openings 11 formed in the end bars 3 of the frame of the section 1 at points midway between the points of juncture of the said end bars and the bottom bars 4 and 5, the studs being preferably reduced so as to form a shoulder bearing against the inner sides of the respective end bars 3. The said studs extend entirely through the end bars and their projecting ends are threaded as indicated at 12 for the application thereto of wing nuts 13, a washer 14 preferably of rubber being fitted upon the threaded portion of each stud between the nut and the frame member 3, so that when the nuts are tightened, these washers will be compressed between the nuts and frame members and being of rubber, they will serve to effectually hold the nuts against becoming loose when the shield is subjected to vibration and will further prevent rattling of the parts. By reference to Figs. 2 and 3, it will be observed that the studs 8 are located in the longitudinal median line of the ventilator plate and consequently, the plate in its positions of angular adjustment, will have its portions at opposite sides of this line projecting at opposite sides of the plane of the section 1. By so mounting the ventilator plate, the same may be adjusted to assume for example, the position shown in Fig. 3 in which position of the plate, the rush of air striking the face of the windshield above the space 6, will be deflected by the forwardly projecting portion of the ventilator plate and currents of air will be established flowing through the space 6 downwardly and toward the floor and forward seat of the vehicle. Air will also strike the under and forward side of the ventilator plate and be directed through the space 6 and will be deflected by the rearwardly extending portion of the ventilator plate in a downward direction and rearwardly of the dash and toward the floor of the vehicle. These air currents will of course cool the surface of the dash and the floor and prevent these parts of the vehicle from becoming uncomfortably heated from the engine.

In order that the ventilator plate 7 may more or less completely close the space 6 and in order that the plate when in closed position will not be liable to rattle, the upper and lower edges of the plate are formed with approximately semi-cylindrical channels 15 of dimensions to partly embrace the bottom bars 4 and 5 in the manner shown in Fig. 4 of the drawings, and each channel is provided with a lining 16 of rubber, leather, cloth, or in fact, any material suitable for the purpose. It will now be apparent that when the ventilator plate is in closed position it will seat snugly at its upper and lower edges against the bottom bars 4 and 5 and in a manner to effectually exclude rain from the interior of the vehicle. If desired, the ventilator plate may be made of wood as indicated at 17 in Fig. 5 of the drawings in which event it will be pivotally mounted between the end bars 3 in any suitable manner as for example, by means of stud bolts secured in its ends and provided with nuts and washers, as above described. Where the ventilator plate is of the form shown in Fig. 5, its upper and lower edges are rabbeted or grooved as at 18 in a manner to correspond to the contour of the bottom bars 4 and 5 of the frame of the section 1, and these grooves or rabbets are lined with strips 19 corresponding to the strips 16. In that form of the invention shown in Fig. 6, the ventilator plate is indicated by the numeral 20 and its body is of wood and its opposite faces are rabbeted along their upper and lower edges as at 21, and metallic strips or bars 22 are secured to the said faces of the plate in the rabbets 21 and project above and below the plate in position for coöperation with the frame members 4 and 5. Strips 23 corresponding to the strips 16 and 19 are secured within the concavities of the upper and lower edges of the plate 20 and against the inner faces of the strips 22.

In that form of the invention shown in Fig. 7, the ventilator plate is indicated by the numeral 24 and may be in the form of a flat sided board or plate of any suitable material, and in this form, the upper and lower edges of the plate are not constructed to partly embrace the frame members 4 and 5, but strips 25 are secured upon the opposite faces of the plate at the upper and lower edges thereof and are arranged to bear against the sides of the frame of the section 1. In this form of the invention, the plate is supported for angular adjustment by a bar 26 which is secured by rivets or other suitable fastening devices upon one face of the plate 24 at the longitudinal median line thereof and the ends of this bar are provided with pivot studs 27 which are integral therewith and which serve the same purpose as the studs 8.

Having thus described my invention, what I claim and desire to secure by Letters Patent is:—

1. The combination with a windshield having spaced frame members defining an air space, of a ventilator plate mounted for angular adjustment between the said members and arranged when in closed position to have its edge portions engage against the said frame members, the said edge portions of the plate being channeled to partly embrace the said frame members.

2. The combination with a wind shield having spaced frame members defining an air space, of a ventilator plate mounted for angular adjustment between the said members and having its longitudinal edge portions channeled whereby to partly embrace the said frame members when the plate is in closed position, and facing strips arranged within the channels.

In testimony whereof I affix my signature in presence of two witnesses.

JESSE H. BERRY. [L. S.]

Witnesses:
W. H. FERGUSON,
W. M. GRAHAM.